United States Patent
Kannan et al.

(10) Patent No.: US 12,287,964 B2
(45) Date of Patent: Apr. 29, 2025

(54) SYSTEM AND METHOD FOR MANAGING QUEUES IN SYSTEMS WITH HIGH PARALLELISM

(71) Applicants: Samsung Electronics Co., Ltd., Suwon-si (KR); RUTGERS, THE STATE UNIVERSITY OF NEW JERSEY, New Brunswick, NJ (US)

(72) Inventors: Sudarsun Kannan, Rahway, NJ (US); Yujie Ren, Piscataway, NJ (US); Rekha Pitchumani, Herndon, VA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

(21) Appl. No.: 17/931,061

(22) Filed: Sep. 9, 2022

(65) Prior Publication Data
US 2023/0400981 A1    Dec. 14, 2023

Related U.S. Application Data

(60) Provisional application No. 63/350,809, filed on Jun. 9, 2022.

(51) Int. Cl.
*G06F 3/06* (2006.01)

(52) U.S. Cl.
CPC .......... *G06F 3/0604* (2013.01); *G06F 3/0659* (2013.01); *G06F 3/0679* (2013.01); *G06F 2209/5018* (2013.01)

(58) Field of Classification Search
CPC .... G06F 3/0604; G06F 3/0659; G06F 3/0679; G06F 3/061; G06F 3/0656; G06F 3/0613; G06F 3/0688

USPC .............. 711/103, 154, E12.001, E12.008
See application file for complete search history.

(56) References Cited

U.S. PATENT DOCUMENTS

| | | |
|---|---|---|
| 7,058,064 B2 | 6/2006 | Nemirovsky et al. |
| 8,266,633 B1 | 9/2012 | Saulsbury et al. |
| 8,285,974 B2 | 10/2012 | Singh et al. |
| 9,600,206 B2 * | 3/2017 | Kotagiri .................. G06F 3/065 |
| 10,275,160 B2 | 4/2019 | Freyensee et al. |
| 10,466,903 B2 | 11/2019 | Benisty et al. |
| 10,579,305 B2 | 3/2020 | Lu |
| 10,831,684 B1 | 11/2020 | Kamran et al. |

(Continued)

FOREIGN PATENT DOCUMENTS

| | | |
|---|---|---|
| WO | 2017056220 A1 | 4/2017 |
| WO | 2018049899 A1 | 3/2018 |
| WO | 2020/150019 A1 | 7/2020 |

OTHER PUBLICATIONS

Bjørling, M. et al., "Linux Block IO: Introducing Multi-queue SSD Access on Multi-core Systems", SYSTOR '13, Jun. 30, 2013 through Jul. 2, 2013, 2013, 10 pages, ACM.

(Continued)

*Primary Examiner* — Yaima Rigol
*Assistant Examiner* — Edward Waddy, Jr.
(74) *Attorney, Agent, or Firm* — Lewis Roca Rothgerber Christie LLP

(57) ABSTRACT

A system and method for managing queues for persistent storage. In some embodiments, the method includes opening, by a first thread running in a host, a first storage object; and creating, by the host, in a memory of the host, a first block device queue, the first block device queue being dedicated to the first storage object.

20 Claims, 6 Drawing Sheets

(56) References Cited

U.S. PATENT DOCUMENTS

| | | | |
|---|---|---|---|
| 10,852,990 B2 | 12/2020 | Yang et al. | |
| 10,996,985 B2 | 5/2021 | Kuttan et al. | |
| 11,074,013 B2 | 7/2021 | Suri et al. | |
| 11,169,743 B2 | 11/2021 | Li et al. | |
| 11,934,672 B2* | 3/2024 | Patel | G06F 3/0656 |
| 2004/0194093 A1* | 9/2004 | Koutharapu | G06F 9/505 718/100 |
| 2015/0134857 A1* | 5/2015 | Hahn | G06F 3/061 710/5 |
| 2016/0306416 A1* | 10/2016 | Browne | G06F 1/3296 |
| 2019/0042305 A1 | 2/2019 | McDonnell et al. | |
| 2020/0174819 A1 | 6/2020 | Dong et al. | |
| 2021/0034552 A1 | 2/2021 | Gokam et al. | |
| 2021/0132858 A1 | 5/2021 | Kamran et al. | |
| 2021/0263789 A1 | 8/2021 | Jeong et al. | |
| 2022/0066822 A1 | 3/2022 | Patel et al. | |
| 2022/0229787 A1* | 7/2022 | Veluswamy | G06F 13/1668 |
| 2023/0073200 A1* | 3/2023 | Jeong | G06F 3/0679 |

OTHER PUBLICATIONS

Kim, T. Y. et al., "Improving Performance by Bridging the Semantic Gap between Multi-queue SSD and I/O Virtualization Framework", 2015, 11 pages, IEEE.

Website: "Multi-Queue Block IO Queueing Mechanism (blk-mq)", retrieved Sep. 1, 2022, 22 pages, https://www.kernel.org/doc/html/latest/block/blk-mq.html, The kernel development community.

Website: "Submitting I/O to an NVMe Device The NVMe Specification", retrieved Sep. 1, 2022, 3 pages, https://spdk.io/doc/nvme_spec.html.

Zhang, J. et al., "FlashShare: Punching Through Server Storage Stack from Kernel to Firmware for Ultra-Low Latency SSDs", 13th USENIX Symposium on Operating Systems Design and Implementation, Oct. 8-10, 2018, Carlsbad, California, USA, 17 pages, USENIX Association.

Kannan, Sudarsun, et al., "Designing a True Direct-Access File System with DevFS," Proceedings of the 16th USENIX Conference on File and Storage Technologies, USENIX, Feb. 2018, 16 pages.

Ren, Yujie, et al., "CrossFS: A Cross-layered Direct-Access File System," Proceedings of the 14th USENIX Symposium on Operating Systems Design and Implementation, USENIX, Nov. 2020, 19 pages.

EPO Extended European Search Report dated Oct. 25, 2023, issued in European Patent Application No. 23176317.8 (9 pages).

Zhang, Jian et al., "FusionFS: Fusing I/O Operations using CISCOps in Firmware File Systems," 20th USENIX Conference on File and Storage Technologies, USENIX, The Advanced Computing Systems Association, Feb. 2022, 16 pages, Retrieved from the Internet: URL:http://www.usenix.org/system/files/fast22_proceedings_interior.pdf.

* cited by examiner

SYSTEM AND METHOD FOR MANAGING
QUEUES IN SYSTEMS WITH HIGH
PARALLELISM

CROSS-REFERENCE TO RELATED APPLICATION(S)

The present application claims priority to and the benefit of U.S. Provisional Application No. 63/350,809, filed Jun. 9, 2022, entitled "SYSTEM AND METHODS FOR DATA-CENTRIC PARALLELISM IN STORAGE SOFTWARE STACK", the entire content of which is incorporated herein by reference.

FIELD

One or more aspects of embodiments according to the present disclosure relate to persistent storage, and more particularly to a system and method for managing queues for persistent storage.

BACKGROUND

In a host connected to one or more persistent storage devices, one or more queues may be created in the host to store commands to be executed by the persistent storage device, or to store responses received from the persistent storage device. The management of such queues may affect the performance, in terms of throughput and latency, of the persistent storage device.

It is with respect to this general technical environment that aspects of the present disclosure are related.

SUMMARY

According to an embodiment of the present disclosure, there is provided a method, including: opening, by a first thread running in a host, a first storage object; and creating, by the host, in a memory of the host, a first block device queue, the first block device queue being dedicated to the first storage object.

In some embodiments, the method further includes: opening, by a second thread running on the host, a second storage object; and creating, by the host, an $N^{th}$ block device queue, N being an integer greater than 1, wherein: the $N^{th}$ block device queue is dedicated to the second storage object, and the host includes exactly M central processing units, M being an integer less than N.

In some embodiments, the first block device queue includes a submission queue and a completion queue.

In some embodiments, the first storage object is stored on a persistent storage device, the persistent storage device being connected to the host through a Nonvolatile Memory Express interface.

In some embodiments, the first storage object is stored on a persistent storage device, the persistent storage device being connected to the host through a Nonvolatile Memory Express over Fabrics interface.

In some embodiments, the method further includes: opening, by a second thread running on the host, a second storage object; and activating, by the host, an inactive block device queue selected from a pool of inactive block device queues, to form an activated queue, the activated queue being dedicated to the second storage object.

In some embodiments, the method further includes requesting, by an application running on the host, use of per-storage-object block device queues, wherein the application includes the first thread.

In some embodiments, the requesting includes making, by the application, a call to an operating system function.

In some embodiments, the requesting includes setting a parameter value in a policy file.

According to an embodiment of the present disclosure, there is provided a system, including: a host, and a persistent storage device, the host including: one or more central processing units, and a memory, operatively connected to the one or more central processing units, and storing instructions that, when executed by the one or more central processing units, cause the system to perform a method, the method including: opening, by a first thread running in the host, a first storage object; and creating, by the host, in the memory, a first block device queue, the first block device queue being dedicated to the first storage object.

In some embodiments, the method further includes: opening, by a second thread running on the host, a second storage object; and creating, by the host, an $N^{th}$ block device queue, N being an integer greater than 1, wherein: the $N^{th}$ block device queue is dedicated to the second storage object, and the host includes exactly M central processing units, M being an integer less than N.

In some embodiments, the first block device queue includes a submission queue and a completion queue.

In some embodiments, the first storage object is stored on the persistent storage device, the persistent storage device being connected to the host through a Nonvolatile Memory Express interface.

In some embodiments, the first storage object is stored on the persistent storage device, the persistent storage device being connected to the host through a Nonvolatile Memory Express over Fabrics interface.

In some embodiments, the method further includes: opening, by a second thread running on the host, a second storage object; and activating, by the host, an inactive block device queue selected from a pool of inactive block device queues, to form an activated queue, the activated queue being dedicated to the second storage object.

In some embodiments, the method further includes requesting, by an application running on the host, use of per-storage-object block device queues, wherein the application includes the first thread.

In some embodiments, the requesting includes making, by the application, a call to an operating system function.

In some embodiments, the requesting includes setting a parameter value in a policy file.

According to an embodiment of the present disclosure, there is provided a system, including: a host, and a persistent storage device, the host including: means for processing, and a memory, operatively connected to the means for processing, and storing instructions that, when executed by the means for processing, cause the system to perform a method, the method including: opening, by a first thread running in the host, a first storage object; and creating, by the host, in the memory, a first block device queue, the first block device queue being dedicated to the first storage object.

In some embodiments, the first block device queue includes a submission queue and a completion queue.

BRIEF DESCRIPTION OF THE DRAWINGS

These and other features and advantages of the present disclosure will be appreciated and understood with reference to the specification, claims, and appended drawings wherein:

DETAILED DESCRIPTION

Figure 1:
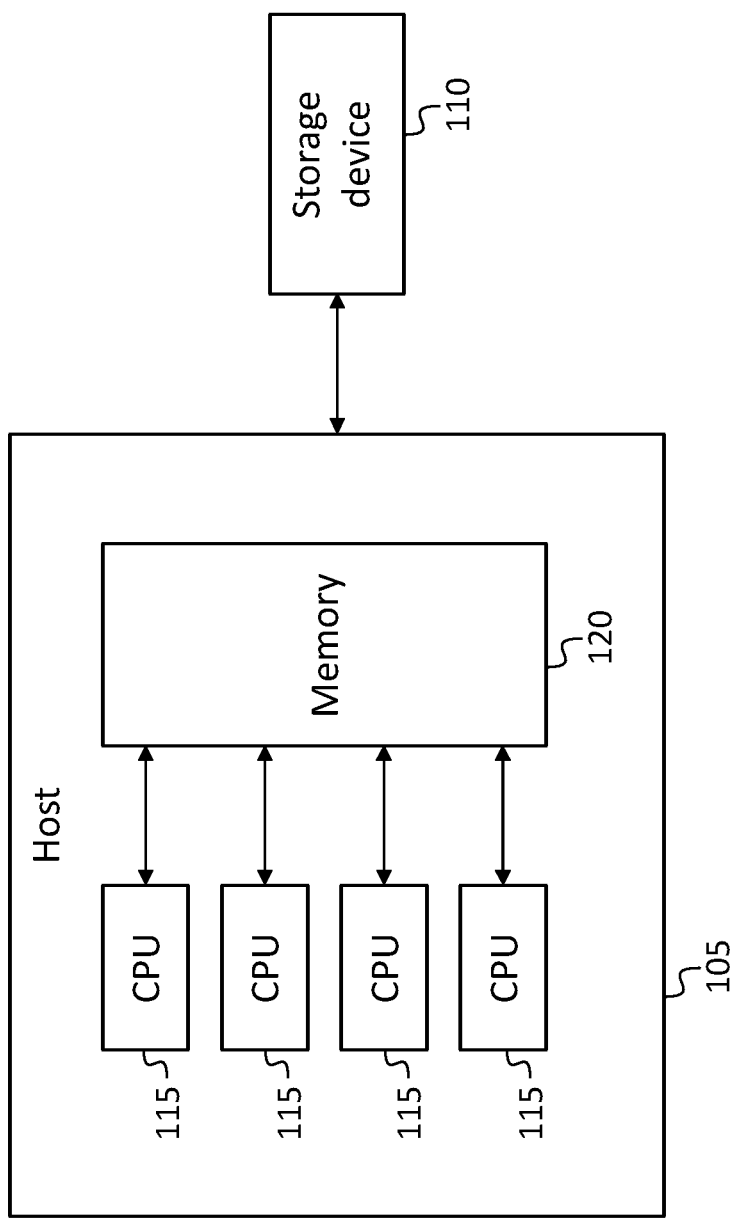
FIG. 1 is a block diagram of a system, according to an embodiment of the present disclosure.

The detailed description set forth below in connection with the appended drawings is intended as a description of exemplary embodiments of a system and method for managing queues for persistent storage provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

In a system (e.g., in a server system) including a host and one or more persistent storage devices, threads running on the host may interact with files in the persistent storage devices, by, for example, opening files, reading from files, and writing to files. Once a file has been opened, interactions with the persistent storage device storing the file may take place using various queues. In the case of a read command, for example, the thread sending the read command may make a suitable function call to an operating system function. The block layer of the operating system and the device driver may then place the read command into a submission queue in host memory and notify the persistent storage device that a new command has been placed in the submission queue (by "ringing the doorbell" of the persistent storage device). The persistent storage device may then fetch the command from the submission queue (using direct memory access (DMA)), and execute the command, placing the data (or a pointer to the data) in a completion queue in host memory (again using DMA). The block layer may also employ queues, which may be referred to as "software queues". The submission queues and the completion queues (which may be created and managed by the device driver (e.g., the NVME driver) may be referred to as "hardware dispatch queues". Each of these queues, or each pair of such queues (each pair being, for example, a submission queue and a completion queue, or a corresponding pair of queues, in the block layer, for handling commands and command completions) may be referred to as a "block device queue". As such, as used herein, a "block device queue" refers to either a single queue or a pair of queues. Each of the persistent storage devices may include a plurality of queues, which may be referred to, if the persistent storage devices are Nonvolatile Memory Express (NVME) persistent storage devices, as NVME hardware queues (or NVME H/W queues). Each NVME hardware queue may be associated with at most one block device queue, and each block device queue may be associated with at most one NVME hardware queue. As such, if the persistent storage device 110 is capable of supporting more NVME hardware queues than there are block device queues, then some of the persistent storage device's capability to support NVME hardware queues may be unused.

The host may include one or more processors (e.g., central processing units or central processing unit cores) (which may also be referred to as central processing units (CPUs)). Each CPU may be or include a stored-program computer (which may be a processing circuit, as discussed below), which, in operation, fetches instructions from host memory and executes the instructions. In some operating systems, such as Linux, each CPU may have a dedicated submission queue and a dedicated completion queue. As such, in a host with, e.g., four cores, four block device queues may be available, making possible the use of up to four NVME hardware queues. An NVME persistent storage device, however, may support a significantly larger number of NVME hardware queues, e.g., 1024 hardware queues or 4096 hardware queues, or even more. As such, a relatively large number of available hardware queues may be unused in such a situation.

In some embodiments, instead of creating one block device queue per layer per CPU, the operating system may create one block device queue per file in each layer (e.g., in the block layer and in the device driver). Such an approach may result in the creation of a significantly larger number of queues, and avoid the need for multiple threads, each accessing different files, to share a relatively small number of queues.

FIG. 1 shows a system including a host 105 connected to a persistent storage device 110. The host 105 includes a plurality of (e.g., four) CPUs (or cores) 115 each connected to a host memory 120. The persistent storage device 110 may be an NVME solid state drive (SSD) for example, connected to the host via an NVME interface or via an NVME over Fabrics (NVMEoF) interface. In some embodiments multiple persistent storage devices 110 (some of which may be local, e.g., connected to the host via an NVME interface), and some of which may be remote (e.g., connected to the host via an NVMEoF interface) may be connected to the host 105. The persistent storage device 110 may store files, as discussed above, or it may be otherwise organized, storing, for example data objects, or key-value pairs. As used herein, the term "storage object" means any such unit of data stored in persistent storage, e.g., a file, a data object, or the value of a key-value pair. If storage objects other than files are stored in the persistent storage device 110, then a separate, dedicated block device queue may be used, in each layer, for each storage object, in a manner analogous to that described above for the case in which the storage objects are files.

Figure 2A:
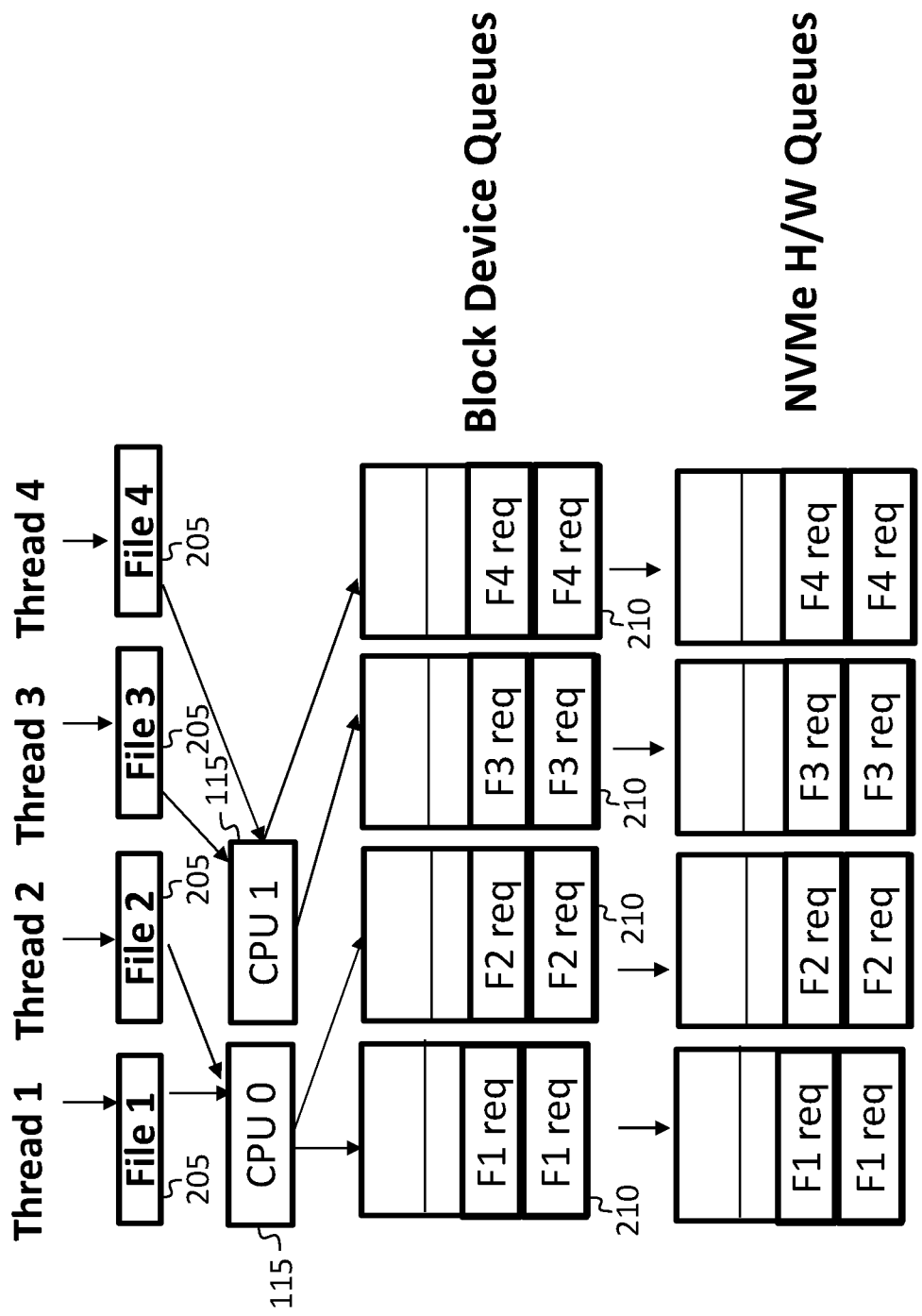
FIG. 2A is a command and queue diagram, according to an embodiment of the present disclosure.

FIG. 2A shows an embodiment in which, as discussed above, each storage object (e.g., each file, of four files 205 labeled "File 1" through "File 4" in FIG. 2A) is associated with a dedicated block device queue 210. As used herein, a "dedicated" block device queue is a block device queue that does not store commands (e.g., in a submission queue of the block device queue) or command completions (e.g., in a completion queue of the block device queue) related to any other storage object. In the embodiment of FIG. 2A, the host 105 includes two CPUs 115. In the example illustrated, four threads (Threads 1-4) have each opened a respective file (File 1-File 4) and four block device queues 210 have been assigned to the four files, each file having assigned to it a dedicated block device queue 210. When dedicated, per-storage-object block device queues are used, the number of block device queues may exceed the number of CPUs in the host 105. For example, if the host 105 includes exactly M CPUs (where M is a positive integer) (i.e., the host 105 has neither more than M CPUs nor fewer than M CPUs), the number of block device queues may be equal to N, where N is an integer greater than M.

In a system like that of FIG. 2A, threads may be created by applications running on the CPUs 115. Each thread may run on more than one CPU 115, unless it is pinned, by the application, to a single CPU. When a thread needs to access a storage object for the first time, it may make an operating system call to open the storage object, passing in a storage object identifier that identifies the storage object (e.g., a file identifier, if the storage object is a file). In response to this call, the operating system may, in each layer, create a block device queue 210 and assign it to the storage object. To create the block device queue 210, the operating system may either (i) create a new block device queue 210, or (ii) activate an inactive block device queue. To activate an inactive block device queue, the operating system may check a pool of inactive block device queues (queues no longer used for the purpose for which they were created) to determine whether any inactive queues are available, and, if so, it may activate such a block device queue. The operating system may maintain a mapping (e.g., a table) identifying, for each storage object identifier, the block device queue 210 assigned to the storage object.

Thereafter, when the thread (or another thread, as discussed in further detail below) needs to send a command (e.g., a read or write command) to the persistent storage device 110, it may make the corresponding operating system call, again passing in the identifier for the storage object. The operating system may then identify, e.g., the block device queue in the device driver corresponding to the storage object, place the command in the submission queue of the block device queue, and ring the doorbell of the persistent storage device 110. The persistent storage device 110 may then, as described above, read the command using DMA, execute the command (e.g., reading data from, or writing data to, persistent memory in the persistent storage device 110) and write a command completion into the completion queue of the block device queue.

The correspondence of threads to storage objects need not be one-to-one. For example, a single thread may open, and interact with, multiple storage objects (e.g., multiple files), and several threads may share a file (e.g., a first thread may open a file, and a second thread may read from, or write to, the file).

In some embodiments, an application may be able to indicate whether per-storage-object block device queues are to be used for any storage object access (e.g., file access) needed by the application. The application may make such an indication, for example, by requesting the use of per-storage-object block device queues. Such a request may be made by a suitable operating system function call (which the application may make at startup). When the application calls such a system function, it may pass in an argument indicating whether or not per-storage-object block device queues are to be used, and the operating system may store the application's preference and create queues accordingly. Another way that such a request may be made is by saving, in a policy file, a parameter value indicating that the application requests the use of (or requests not to use) per-storage-object block device queues.

In some embodiments, the use of block device queues to communicate with a persistent storage device 110 may be performed by the kernel of the operating system. In other embodiments, an application, which may be a user-level process, may communicate directly with a persistent storage device 110, e.g., using Storage Performance Development Kit (SPDK) and a user-level driver. In such an embodiment, the queue management performed by the user-level process may also use one block device queue per file or per storage object, in each layer.

In some embodiments, scalable queue creation and request assignment may be dynamically determined by the system. For example, more than one queue (e.g., N queues) may be used per file; in such a situation, the queues may be used in a round robin fashion. As another example, one queue may be used per set of files, or per set of objects, or for a block address range. In such a situation, the set or address range may be dynamically determined based on system load. The scalable queue creation and assignment may be determined by the user (e.g., by a user-level application), for example while opening a file or object, or while issuing read and write request, through additional queue parameters.

If the persistent storage device 110 is an NVME persistent storage device, then the interface between the host 105 and the persistent storage device 110 may include a Peripheral Component Interconnect Express (PCIe) interface, including one or more data lanes. In operation, each of the block device queues of the device driver may be assigned, dynamically, to one or more of the data lanes. For example, if the host 105 determines that a data lane is underutilized, it may cause an existing block device queue to use the underutilized lane instead of, or in addition to, a data lane that the block device queue has been using.

Figure 2B:
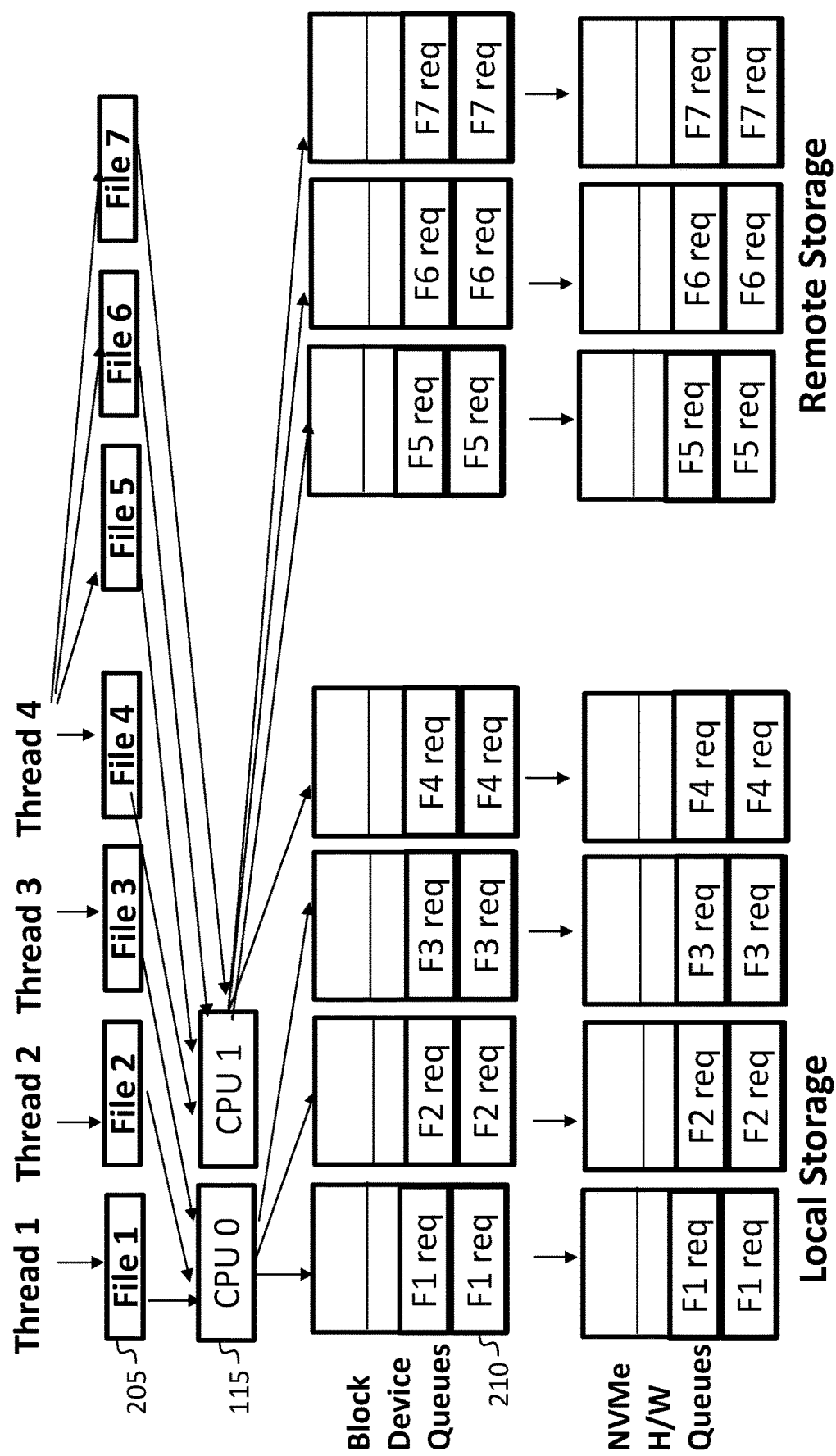
FIG. 2B is a command and queue diagram, according to an embodiment of the present disclosure.

The operation of the embodiments described herein may be generally unaffected by whether a persistent storage device 110 is local or remote. For example, FIG. 2B shows the operation of a system including both local storage (e.g., persistent storage devices 110 connected to the host 105 by respective NVME interfaces) and remote storage (e.g., persistent storage devices 110 connected to the host 105 by respective NVMEoF interfaces). The operation of the block device queues with storage objects stored on the remote persistent storage devices 110 may be substantially the same as the operation of the block device queues with storage objects stored on the local persistent storage devices 110.

Figure 3A:
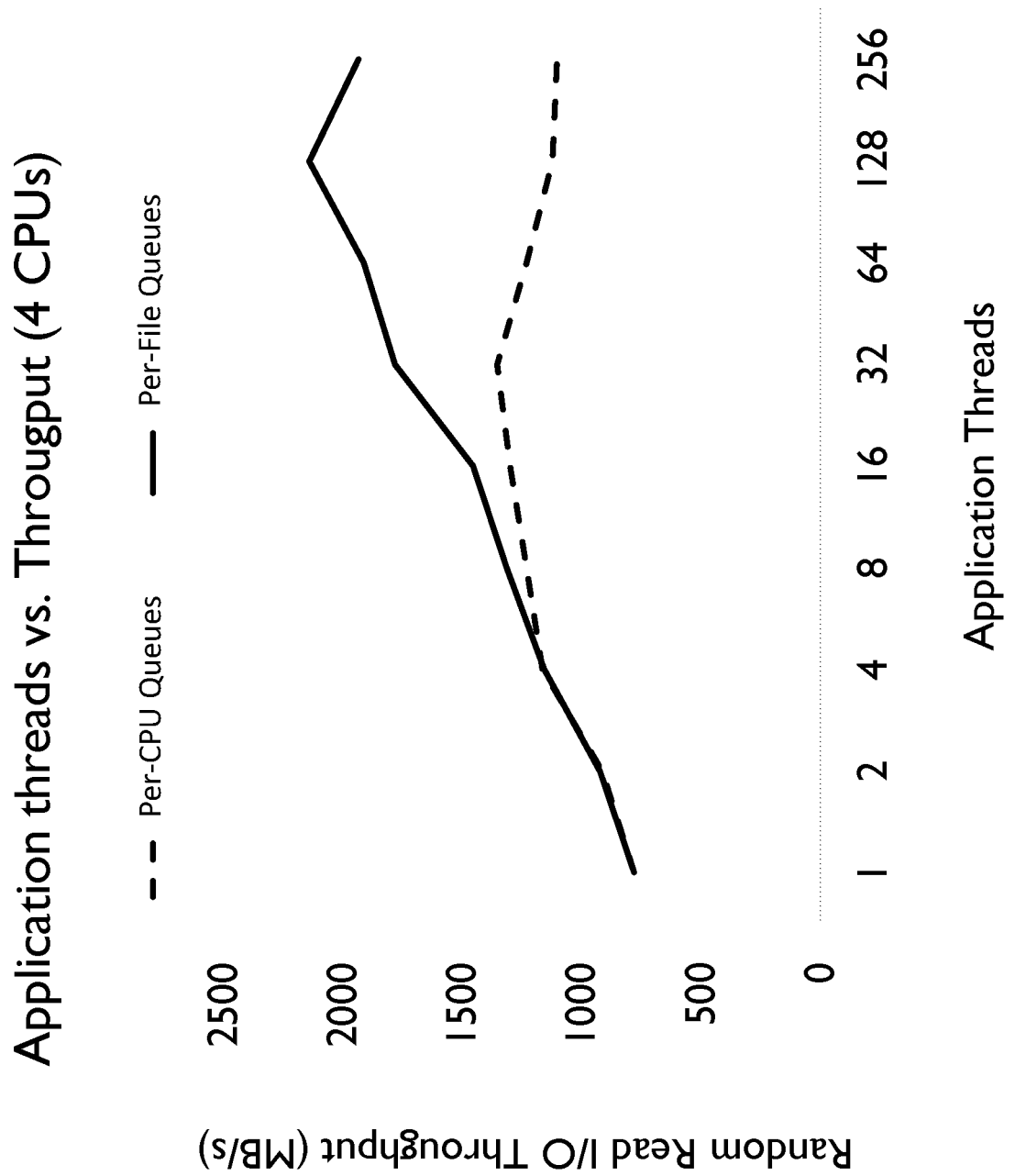
FIG. 3A is a graph showing a performance comparison, according to an embodiment of the present disclosure.
Figure 3B:
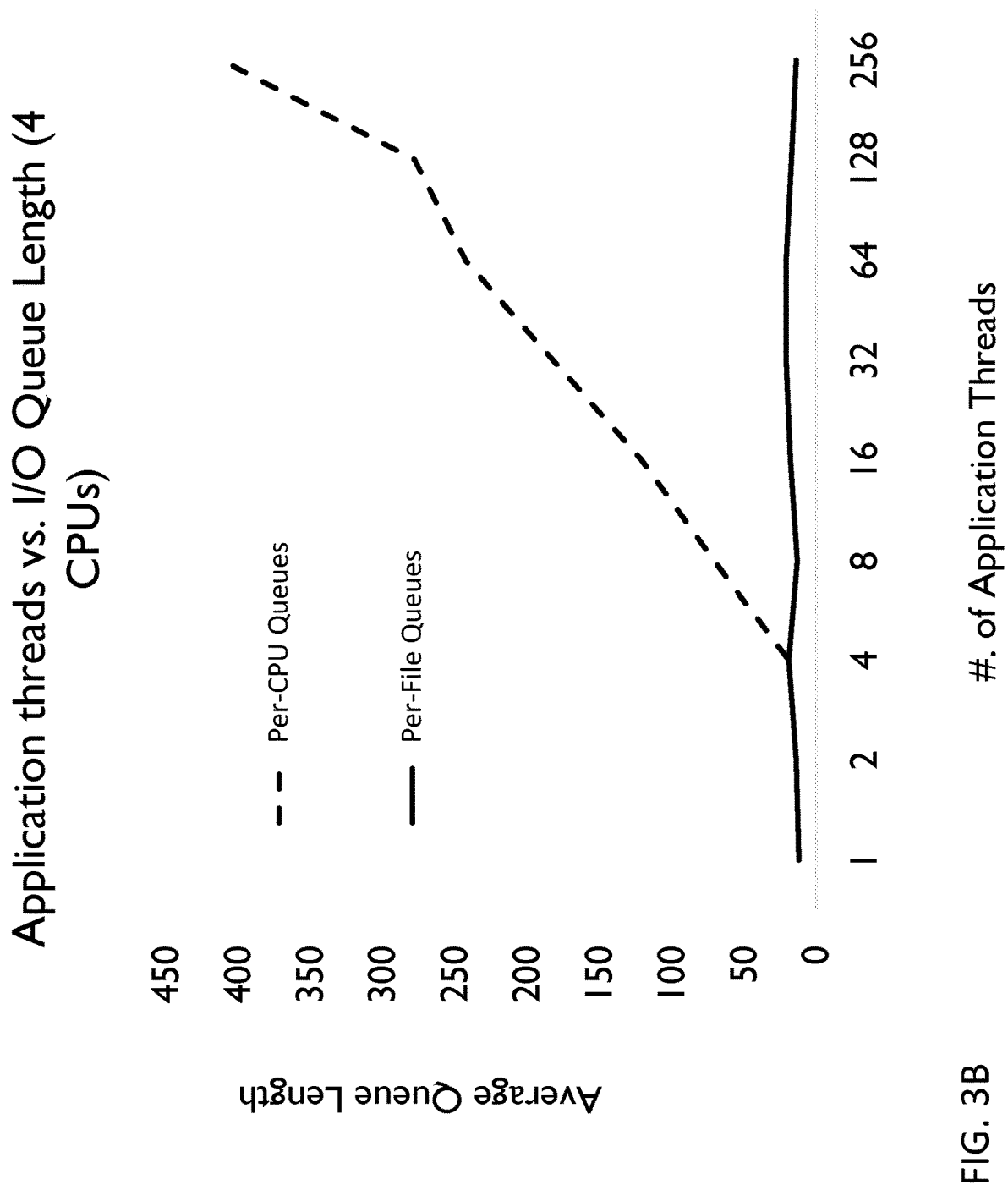
FIG. 3B is a graph showing a performance comparison, according to an embodiment of the present disclosure.

FIGS. 3A and 3B show results of benchmarking tests, demonstrating performance improvements achievable in some embodiments. In the benchmarking tests, throughput and block device queue length were monitored for various tests, each test involving a respective number of threads, each thread performing read operations from a respective file. In each of FIGS. 3A and 3B, a solid line (labeled "Per-File Queues") shows the performance of an embodiment using per-storage-object block device queues, and a dashed line (labeled "Per-CPU Queues") shows the performance of an otherwise similar system using per-CPU block device queues. It may be seen from FIGS. 3A and 3B that the achievable throughput is significantly greater (FIG. 3A) and the queue length is significantly shorter (FIG. 3B) when more than four threads (reading from a corresponding number of files) are running on a system with four CPUs.

Figure 4:
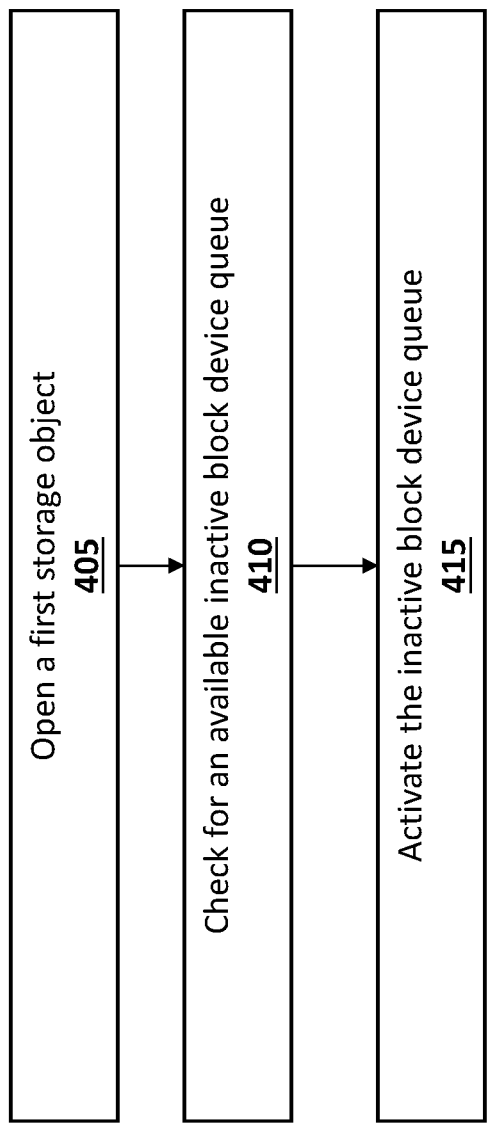
FIG. 4 is a flowchart of a method, according to an embodiment of the present disclosure.

FIG. 4 is a flowchart of a method. In some embodiments, the method includes opening, at 405, by a first thread running in a host, a first storage object; and creating, by the host, in a memory of the host, a first block device queue. The creating of the first block device queue may include checking, at 410, by the operating system, for an available inactive block device queue, and activating, at 415, the available inactive block device queue (which may include a submission queue). The first block device queue may be dedicated to the first storage object.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second quantity is "within Y" of a first quantity X, it means that the second quantity is at least X-Y and the second quantity is at most X+Y. As used herein, when a second number is "within Y %" of a first number, it means that the second number is at least (1−Y/100) times the first number and the second number is at most (1+Y/100) times the first number. As used herein, the term "or" should be interpreted as "and/or", such that, for example, "A or B" means any one of "A" or "B" or "A and B".

The background provided in the Background section of the present disclosure section is included only to set context, and the content of this section is not admitted to be prior art. Any of the components or any combination of the components described (e.g., in any system diagrams included herein) may be used to perform one or more of the operations of any flow chart included herein. Further, (i) the operations are example operations, and may involve various additional steps not explicitly covered, and (ii) the temporal order of the operations may be varied.

Each of the terms "processing circuit" and "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Similarly, a range described as "within 35% of 10" is intended to include all subranges between (and including) the recited minimum value of 6.5 (i.e., $(1-35/100)$ times 10) and the recited maximum value of 13.5 (i.e., $(1+35/100)$ times 10), that is, having a minimum value equal to or greater than 6.5 and a maximum value equal to or less than 13.5, such as, for example, 7.4 to 10.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for managing queues for persistent storage have been specifically described and illustrated herein, many modifications and variations will be apparent to those skilled in the art. Accordingly, it is to be understood that a system and method for managing queues for persistent storage constructed according to principles of this disclosure may be embodied other than as specifically described herein. The invention is also defined in the following claims, and equivalents thereof.

What is claimed is:

1. A method, comprising:
executing an application by a host, wherein the application creates a first thread, the first thread transmitting a first request to an operating system of the host for a first file, wherein the first file is stored in a storage device connected to the host;
creating by the operating system of the host based on the first request, in a memory of the host, a first block device queue, the first block device queue being dedicated to the first file; and
receiving, by the host, access of the first block device queue by the storage device for retrieving data associated with the first file.

2. The method of claim 1, further comprising:
opening, by a second thread running on the host, a second file; and
creating, by the host, an $N^{th}$ block device queue, N being an integer greater than 1,
wherein:
the $N^{th}$ block device queue is dedicated to the second file,
the host includes exactly M central processing units, M being an integer and less than N.

3. The method of claim 1, wherein the first block device queue comprises a submission queue and a completion queue.

4. The method of claim 1, wherein the first file is stored on a persistent storage device, the persistent storage device being connected to the host through a Nonvolatile Memory Express interface.

5. The method of claim 1, wherein the first file is stored on a persistent storage device, the persistent storage device being connected to the host through a Nonvolatile Memory Express over Fabrics interface.

6. The method of claim 1, further comprising:
opening, by a second thread running on the host, a second file; and
activating, by the host, an inactive block device queue selected from a pool of inactive block device queues, to form an activated queue,
the activated queue being dedicated to the second file.

7. The method of claim 1, further comprising requesting, by the application running on the host, use of per-storage-object block device queues, wherein the application comprises the first thread.

8. The method of claim 7, wherein the requesting comprises making, by the application, a call to an operating system function.

9. The method of claim 8, wherein the requesting comprises setting a parameter value in a policy file.

10. A system, comprising:
a host configured with an operating system, and
a persistent storage device,
the host comprising:
one or more central processing units, and
a memory, operatively connected to the one or more central processing units, and storing instructions that, when executed by the one or more central processing units, cause the system to perform a method, the method comprising:
executing an application by the host, wherein the application creates a first thread, the first thread transmitting a first request to the operating system of the host for a first file, wherein the first storage object file is stored in the persistent storage device;
creating, by the operating system of the host, in the memory, a first block device queue, the first block device queue being dedicated to the first file; and
receiving, by the host, access of the first block device queue by the persistent storage device for retrieving data associated with the first file.

11. The system of claim 10, wherein the method further comprises:
opening, by a second thread running on the host, a second file; and
creating, by the host, an $N^{th}$ block device queue, N being an integer greater than 1,
wherein:
the $N^{th}$ block device queue is dedicated to the second file, and
the host includes exactly M central processing units, M being an integer less than N.

12. The system of claim 10, wherein the first block device queue comprises a submission queue and a completion queue.

13. The system of claim 10, wherein the first file is stored on the persistent storage device, the persistent storage device being connected to the host through a Nonvolatile Memory Express interface.

14. The system of claim 10, wherein the first file is stored on the persistent storage device, the persistent storage device being connected to the host through a Nonvolatile Memory Express over Fabrics interface.

15. The system of claim 10, wherein the method further comprises:
opening, by a second thread running on the host, a second file; and
activating, by the host, an inactive block device queue selected from a pool of inactive block device queues, to form an activated queue,
the activated queue being dedicated to the second file.

16. The system of claim 10, wherein the method further comprises requesting, by the application running on the host, use of per-storage-object block device queues, wherein the application comprises the first thread.

17. The system of claim 16, wherein the requesting comprises making, by the application, a call to an operating system function.

18. The system of claim 17, wherein the requesting comprises setting a parameter value in a policy file.

19. A system, comprising:
a host configured with an operating system, and
a persistent storage device,
the host comprising:
means for processing, and
a memory, operatively connected to the means for processing, and storing instructions that, when executed by the means for processing, cause the system to perform a method, the method comprising:
executing an application by the host, wherein the application creates a first thread, the first thread transmitting a first request to the operating system of the host for a first file, wherein the first file is stored in a storage device connected to the host;
creating, by the operating system of the host, in the memory, a first block device queue,
the first block device queue being dedicated to the first file; and
receiving, by the host, access of the first block device queue by the storage device for retrieving data associated with the first file.

20. The system of claim 19, wherein the first block device queue comprises a submission queue and a completion queue.

\* \* \* \* \*